US006688828B1

(12) United States Patent
Post (10) Patent No.: US 6,688,828 B1
(45) Date of Patent: Feb. 10, 2004

(54) SELF-TORQUING FASTENERS (75) Inventor: Alvin M. Post, Mesa, AZ (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 10/085,693

(22) Filed: Feb. 26, 2002

Related U.S. Application Data (63) Continuation of application No. 10/007,112, filed on Dec. 3, 2001, now abandoned.
(60) Provisional application No. 60/250,787, filed on Dec. 1, 2000.

(51) Int. Cl.[7] .................................................. F16B 35/02
(52) U.S. Cl. .................. 411/383; 411/909; 411/DIG. 2; 411/378; 411/383; 411/384; 411/427; 411/915; 411/916
(58) Field of Search .......................... 411/909, DIG. 2, 411/378, 383, 384, 427, 915, 916

(56) References Cited

U.S. PATENT DOCUMENTS

| 3,416,823 | A | * | 12/1968 | Auer |
| 5,120,175 | A | * | 6/1992 | Arbegast |
| 5,312,152 | A | * | 5/1994 | Woebkenberg |
| 5,624,508 | A | | 4/1997 | Flomenblit et al. |
| 5,772,378 | A | * | 6/1998 | Keto-Tokoi |
| 5,791,847 | A | * | 8/1998 | Keto-Tokoi |
| 6,071,308 | A | | 6/2000 | Ballou et al. |
| 6,276,883 | B1 | * | 8/2001 | Unsworth et al. |
| 6,306,671 | B1 | | 10/2001 | Silverbrook |

* cited by examiner

Primary Examiner—Flemming Saether
(74) Attorney, Agent, or Firm—Christie, Parker & Hale, LLP.

(57) ABSTRACT

A bolt made from shape memory alloy that exists in a first state and is capable of changing to a second state when heated and remains in that second state even when cooled is used to self torque itself and clamp a first fixture to a second fixture. Preferred methods for using the self-torquing bolt are disclosed.

22 Claims, 3 Drawing Sheets

SELF-TORQUING FASTENERS

REFERENCE TO RELATED APPLICATION

The present application is a continuation of patent application Ser. No. 10/007,112, filed Dec. 3, 2001, now abandoned, and to provisional application No. 60/250,787, filed Dec. 1, 2000, the contents of which are hereby expressly incorporated herein by reference.

BACKGROUND

In a large number of applications, structures are assembled or clamped together with fasteners, or tightened together to prevent fluids leaking from between the structures. This requires proper torquing with compressive loads being applied to fasten the structures together. Thus, torquing is a means by which users, assemblers, or mechanics tighten a fastener to a designed or desirable tension to thereby impart a compressive force against two structures such as an engine cover and an engine block. Torquing also creates friction on the threads of a threaded fastener, which serves to prevent the fastener from unintentionally unscrewing due to vibration.

The force applied to the fastener to preload the fastener is usually expressed in foot-pound units. Generally speaking, the torquing process involves determining a desired torque value for a particular application, and then, with a torque wrench or by other means, the head of the bolt, or a nut threaded onto the bolt, is tightened until the desired torque value is achieved. Torquing is also performed on some large bolts by stretching the bolt with hydraulic or other devices, screwing a nut on the bolt as far as possible, and then removing the stretching force. Yet another way to tighten certain bolts is to heat the bolt until it expands sufficiently, then screw a nut on the bolt as far as possible, and then let the bolt cool and shrink in length. The load applied by the bolt transfers across the structures being fastened together by the bolt, thereby creating a compressive force in the structures.

In large manufacturing plants, such as an automotive plant, where torquing is required for a large number of bolts, the torquing process itself can be time consuming and expensive. This is because, among other things, each individual bolt requires individual attention to ensure that it is tightened to the proper torque.

In addition to the time, labor, and costs involved in torquing large quantities of bolts, maintenance of torque wrenches and torque machines used to tighten the bolts results in further expenses. For example, torque wrenches and torque machines have moving parts which can break, and the torque devices require routine service and calibration to maintain them in good working order. Large bolts, such as those employed in the oil exploration/production, present safety concerns due to their size and weight. Bolts used on oil platforms can be up to approximately one foot in diameter. Thus, to torque such large bolts to the desired torque value, a mechanic must use correspondingly large tools which can cause severe injuries if mishandled. Furthermore, bolts used for construction in challenging environments such as underwater or in space are difficult to torque by any means.

Accordingly, there is a need for a self-torquing fastener that torques itself to a desirable value with minimum human intervention. The use of self-torquing fasteners minimize the time, cost, and will improve the safety involved in the torquing operation.

SUMMARY

The present invention provides a new and unique self-torquing bolt and methods for torquing a first structure to a second structure. Preferred embodiments include a bolt that changes from a first shape to a second shape with the application of heat, and remains in that second shape even after the bolt cools.

In one embodiment, the aforementioned bolt is configured with a cavity, wherein the cavity is configured to store chemicals which, when reacted, emit heat sufficient to change the bolt from the first shape to the second shape.

In another embodiment, a two-part bolt assembly comprising an inner bolt and an outer threaded collar made from a shape memory alloy is provided. The inner bolt further includes a threadless stem and an axial retainer, and the threaded collar further includes a channel and an annular space. The bolt is disposed within the annular space and is attached to the threaded collar by the axial retainer.

These as well as other objects and advantages of the present invention will be apparent from the following specification and the accompanying drawings, which are for purposes of illustration only. Furthermore, it is understood that the changes in the specific structure shown and described may be made within the scope of the claims without departing from the spirit and scope of the invention.

DETAILED DESCRIPTION

The detailed description set forth below in connection with the appended drawings is intended as a description of the presently preferred embodiments of the self-torquing bolt provided in accordance with the present invention and is not intended to represent the only forms in which the present invention may be constructed or utilized. The description sets forth the features and the steps for constructing and using the self-torquing bolt of the present invention in connection with the illustrated embodiments. It is to be understood, however, that the same or equivalent functions and structures may be accomplished by different embodiments that are also intended to be encompassed within the spirit and scope of the invention. Also, as denoted elsewhere herein, like element numbers are intended to indicate like or similar elements or features.

Numerous shape memory alloy applications have been described in issued U.S. Patents, including U.S. Pat. Nos. 5,624,508; 6,071,308; and 6,306,671, the disclosure of which are expressly incorporated herein by reference. However, to the knowledge of the inventor of the present embodiments of the self-torquing fasteners, none have described the use of shape memory alloys for self-torquing fasteners or bolts. Accordingly, the exemplary embodiments described herein incorporate shape memory alloys into self-torquing fasteners to tighten a first structure to a second structure by heat activation. Advantageously, the application of the self-torquing bolts eliminate the need for torque wrenches or other torque devices and associated costs of manual torquing and maintenance of the torque devices.

In broad terms, when two surfaces are mated (such as, for example, two flange surfaces or the seating surfaces of an engine cover and an engine block), a certain hold-down pressure or force is required to keep the seam between the two mating surfaces compressed. This required hold-down pressure or force depends on the system and the application and whether and what type of gasket is used. For example, a mating set of flanges on parts containing a pressurized fluid in a 100 psi service environment requires less pressure to seal than the same mating flanges in a 500 psi service environment. These factors are incorporated to compute the hold-down force or preload value that is required to be applied to a set of bolts so that the two mating surfaces are held together with sufficient compressive force to prevent leakage.

In addition to the foregoing factors, the torque value for a bolt also depends on the shank diameter, fastener yield point, torque to extend the fastener to the desired preload (such as 90% of yield), torque needed to overcome the thread friction, and torque needed to overcome the nutface (or boltface) friction. A value is then derived which, when a bolt is torqued, would stretch the bolt to the desired yield point and generate the desired load on the mating seam. The torque value is typically expressed in a foot-pound unit (which is equivalent to a force applied on a one foot wrench to generate the desirable stress on the fastener) to preload the fastener to a certain force.

The present exemplary embodiments are intended to generate the same type of preload force on the fasteners as discussed above but through different means. Instead of torquing the fastener, since a torque wrench is not used, the amount of "stretch" in the fastener equivalent to the desirable preload force from torquing is obtained by causing the fastener to shrink in length. As further discussed below, the fastener is fabricated from a shape memory alloy. During this fabrication process, the fastener is "stretched" from an original length to a "stretched" length where the "stretched" length is chosen to produce the desired preload force after fastener installation is fully completed. The fastener is used to attach two structures in its stretched state. When the fastener is subsequently "unstretched" so that it returns to its original, shorter length, the fastener clamps the two structures together. The unstretching compresses the two structures to a desirable hold-down value that is equivalent to the desired preload force generated by the bolt had it been torqued by a wrench.

As an overview of shape memory alloys, they are known in the art and, according to one account, date back to as early as 1962 when it was accidentally discovered that a Ni—Ti alloy ingot, which was produced in a vacuum furnace, changed shape when it was left in direct sunlight. With subsequent contributions by various institutions and researchers, it is now known that the "memory" property of shape memory alloys is a manifestation of the alloys' ability to undergo a phase change.

Currently, there are more than a dozen known shape memory alloys. As further discussed below, these alloys are termed "shape memory alloys" because they exhibit unusual elastic properties and shape change characteristics caused by plastic deformation. Examples of shape memory alloys include: nickel-titanium (also commonly referred to as Nitinol); titanium-palladium-nickel; iron-zinc-copper-aluminum; titanium-niobium-aluminum; titanium-niobium; copper-aluminum-nickel; uranium-niobium; copper-zinc-aluminum; nickel-titanium-copper; iron-manganese-silicon; hafnium-titanium-nickel; nickel-iron-zinc-aluminum; copper-aluminum-iron; nickel-zirconium-titanium; and zirconium-copper-zinc. However, only those that can recover substantial amounts of strain or that can generate a significant amount of force upon changing shape have potential torquing application. In other words, only certain shape memory alloys are capable of relatively large elastic deformation (i.e., stretching without permanent deformation) during one phase and which, when transformed to another phase, are capable of recovering most, if not all, of the strain applied. It is these alloys that are considered to be useful in torquing applications. Examples of alloys with acceptable strain recovery include nickel-titanium alloys and copper base alloys such as copper-zinc-aluminum and copper-aluminum-nickel, and iron-manganese-silicon. In an exemplary embodiment, Fe-8Cr-5Ni-20Mn-5Si can be used to make the self-torquing bolt of the present invention. This alloy offers a suitable working temperature range and has characteristics that resemble stainless steel.

The term "polymorphic" is used to describe a material's ability to exist in more than one crystal structure. As further discussed below, the two crystal structures commonly found in shape memory alloys are martensite and austenite. Shape memory alloys are therefore polymorphic in nature. When a shape memory alloy is in its martensitic phase, it can be deformed or compressed or stretched, and it will "permanently" retain the deformed or stretched shape until it is later heated to undergo a transformation into its austenitic phase. Accordingly, a bolt formed from a shape memory alloy in its martensite phase may be deformed or shaped by stretching it, and it will for the time being retain that deformed shape. This can be described as "training" the shape memory alloy. It will be understood that the alloy can be compressed instead of stretched, should that be a need for a particular application.

When this trained fastener, in its martensite form, is subsequently heated, it undergoes an austenitic transformation and reverts to its austenite phase. In this austenite phase or form, the fastener shrinks to its pre-deformed shape, i.e., it becomes shorter. Hence, when a fastener is designed to shrink a specific amount when transformed from a first phase to a second phase, it may be used with a set of flanges, or an engine head and an engine cover for example, to clamp the flanges to a predetermined load (i.e., by designing how much shrinkage a suitable bolt will undergo, the pressure on the flanges, as well as on any gasket between the flanges, can be increased to a desired value). When the bolt is in its austenite phase, it is typically stronger and has a higher elastic modulus than when it is in the martensite phase.

On a related point, although the term fastener is used herein throughout as a device for tightening a first structure to a second structure, such as a flange or an engine head to an engine, fastener is intended to broadly mean a threaded fastener, which has a thread form which may be assembled with or without a nut to fasten two structures together, and wherein the threads can be either external with a shank/stem or internal with a bore. In that regard, it may be either a "screw" or a "bolt" as those terms are defined by ANSI-ASME standards. Furthermore, it is also envisioned that other non-threaded fasteners may be made with shape memory alloys to tighten two structures together, such as metal straps for shipping packages or containers or as rivet-like fasteners to clamp two structures together, as further described below.

As discussed above, shape memory alloys have two distinct crystal structures. Which structure is present depends on the temperature and the amount of force that is applied to the shape memory alloy. The martensitic phase exists at lower temperatures and the austenitic phase exists at higher temperatures, with some overlap. The range and the extent to which one or the other phase exists also depends on the type of alloys employed, and the composition or ratio of the metals comprising the alloys. For example, other compounds can be added to Nitinol to change the characteristics of the alloy; these include Cu, Fe, Cr, or V in minute percentages. When these compounds are added, or when the ratio of nickel to titanium in Nitinol is changed, the temperatures in which Nitinol changes form from a martensite phase to an austenite phase have been known to change. For example, by changing the ratio of nickel to titanium, the shape memory alloy can undergo a phase change when exposed to temperatures ranging from above +100 deg. C. to below −100 deg. C. Moreover, the temperature range for the phase transformation (i.e., the start temperature and the final temperature of the phase transformation process in which a shape memory alloy transforms from its martensite phase to its austenite phase) can be manipulated to occur over just a few degrees, and in some instances can be manipulated to occur over just 2–5 degrees if required.

The phase transformation of shape memory alloy can best be explained when viewed in conjunction with the adjacent figure. In manufacturing an exemplary fastener of an exemplary embodiment, it is preferable that the untrained fastener (a fastener that has not been conditioned to change shape with a change in temperature, and will not yet do so) is in (or be converted to) its martensite phase (indicated as 100% along the Y coordinate). It is then "stretched". The fastener is then packaged in its "stretched" state for installation. After the fastener is installed, the fastener is heated and undergoes an austenitic transformation as its temperature rises from As to Af along the X coordinate. During this process, the fastener will shrink to around its original short length. When the fastener cools back to normal environmental temperature, where it spends the rest of its service life, whether the fastener reverts to martensite or not will not affect its shape or length. However, the phase change will affect the strength or elastic modulus of the fastener if it is allowed to transform back to its martensite phase.

Martensite is usually weaker than austenite, so it is desirable to have the fastener remain in its austenitic phase during its service life. In other words, it is possible to shrink the fastener to its original length without also transforming it back to its martensite phase. In an exemplary embodiment, the temperatures in which the "transformed" fastener reverts back to its martensite phase (designated as Ms–Mf in the X coordinate) should be lower than temperatures the fastener will see during its service life. Thus, even when the "transformed" fastener is "cooled" to its nominal operating or service temperature, which is preferably higher than the Ms–Mf temperature range, the fastener remains in its austenite phase. In effect, this allows the fastener to retain its stronger form. In an exemplary embodiment, an alloy with characteristics shown in the diagram is selected because Ms (starting martensite phase change temperature) is below the nominal service temperature. Therefore, as an example, if fasteners are made with an alloy that has a temperature Ms=8 degrees F., such fasteners used underwater or in the tropics will never fall below the Ms temperature and will therefore remain in their stronger austenitic phase, even after shrinkage. The difference between austenitic temperature transformation and the martensitic temperature transformation is known as hysteresis. Therefore, in an exemplary embodiment, the shape memory alloy used to make the fastener should have a wide hysteresis so that after the fastener cools, it still remains in its austenite phase. The temperature Ms and the amount of hysteresis can be chosen to suit the application by proper selection of the composition of the alloy. A shape memory alloy, in its martensite phase, can be deformed into a new shape. When it is later heated to undergo an austenitic transformation, it reverts back to the original "undeformed" shape. This change in shape when a shape memory alloy is exposed to heat is known in the art as a one-way shape memory. That is, upon cooling the shape memory alloy from the austenite phase, it does not change shape or revert back to a different shape even though it has cooled, sufficiently to revert to its martensite phase. However, as discussed above, in an exemplary embodiment, the fastener remains in the austenite phase even after it has cooled to retain its stronger form.

It is also possible to train shape memory alloys to have a two-way shape memory. That is, it is possible to train some of the alloys to change shape when heated and to change shape again when cooled. The methods for training shape memory alloys to have two-way shape memory effect is disclosed in U.S. Pat. No. 5,624,508 to Flomenblit et al., the contents of which are incorporated herein by reference. For purposes of the present exemplary embodiments, two-way shape memory effect is not believed necessary since self-torquing bolts are envisioned during the initial installation stage of a unit or system only and in which a one-way effect is all that is necessary. However, for some bolt applications, a two-way shape memory effect may sometime be preferable. This is especially true where it is desirable to self-torque a fastener during installation and then expand it later to loosen the tension during a repair or a replacement.

Basic manufacturing steps for bolts are well known. The particular techniques generally depend on a number of factors, including mass production, size, strength requirement, and tolerance. Rolling and heading are typically selected for normal sized bolts and for mass production; machining on screw machine is generally good for fabricating small bolts in low or moderate quantity; and machining alone is often the method of choice for large bolts produced in small numbers. Other possible manufacturing techniques include casting, powder processing, welding heads to threads, and rapid prototyping. The preferred embodiments contemplate fasteners manufactured by all the aforementioned techniques.

Accordingly, in an exemplary embodiment, a self-torquing fastener using Nitinol or Fe-8Cr-5Ni-20Mn-5Si is first manufactured (i.e., machined or forged) in its final "short" length by one of the aforementioned techniques, while the alloy is heated so it is in its austenitic phase. The "heated" fastener is then quickly quenched in a cold fluid (somewhere below the Mf temperature) while it continues to be held or constrained in its "short" configuration. After quenching the bolt will be in its martensitic phase and will retain its "short" configuration when the constraints are removed. It is also possible to further machine the fastener in its martensite phase but prior to stretching. In this cooled or martensite phase, the fastener is stretched to thereby "train" the fastener into its unused "long" length. A number of suitable means and known techniques are available for stretching the fastener. These include gripping the bolt on both ends of the bolt and stretching the bolt (such as gripping the bolt at the bolt head and at the threaded end). Alternatively, stretching may be accomplished by radially squeezing the shank of the fastener. After the fastener is sufficiently stretched, the fastener is then ready to be packaged and shipped for use. When this "stretched" fastener is subsequently heated (such as after installing it to fasten two structures together), it will revert to its shorter original length by a one-way effect discussed above.

In an exemplary embodiment, the threaded portion of the bolt will not be stretched. This is so that the geometry of the threads will not change when the bolt is heated and the thread geometry will continue to match the thread geometry of the nut or threaded hole. This will facilitate later removal of the bolt for disassembly of the clamped structure. However, it is recognized that in some applications, the threaded portion of the bolt may also be stretched. This may be done before threads are machined or rolled into the bolt or afterward, but such that the threads on the bolt match the threads on the nut or tapped hole during initial assembly of two structures using the bolt. In this case, the threads will deform after initial assembly and during heating, causing the bolt to be permanently locked into the nut or threaded hole.

Figure 1:
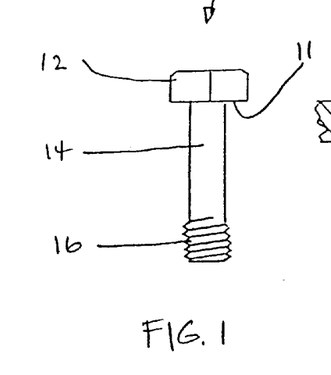
FIG. 1 is an elevation view of one embodiment of a self-torquing bolt provided in accordance with practice of the present invention.
Figure 2:
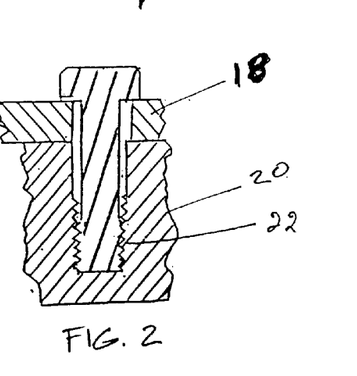
FIG. 2 is a partial cross-sectional view of the self-torquing bolt of FIG. 1 fastening a first member to a second member.

Referring now to FIGS. 1 and 2, there is shown an embodiment of a self-torquing fastener (hereinafter interchangeably described as a "bolt" or a "fastener"), generally designated 10. The bolt 10 includes a head 12, a shank portion 14, and a thread portion 16. The head can be of a number of variety of heads, including a slotted head, a phillips head, a spanner head, a hex head, a pin head, and a carriage bolt head. Similarly, the thread portion 16 can be a number of different threads including rolled and machined threads, and can be of any length including one which extends all the way to the underside surface 11 of the head 12. Moreover, the term bolt may also include studs, which may be described as a round bar stock with threads on both ends and is used by threading a nut on each of the two ends. Finally, it is understood that in this application, as well as all torquing applications, the bolt has been "trained" prior to installation to tighten two structures together.

In a typical application, the bolt 10 is tightened against a nut or is tightened into a tapped hole. Referring specifically to FIG. 2, the bolt 10 is used to tighten an engine cover 18 against an engine block 20. However, as readily understood by persons of ordinary skill in the art, the bolt may instead be used in a number of different applications, including use as a wheel lug, a flange bolt, a hold down bolt for a compressor, etc. Thus, in an exemplary embodiment, the bolt 10 is used to tighten a first structure against a second structure, which in this case is an engine cover against an engine block. In an exemplary embodiment, a snug "finger tight" fit is preferable before heating and transforming the bolt into its final short length. However, it is also possible to tighten the fastener with a wrench to provide a slightly more snug fit before initiating phase transformation. Although not shown, a standard washer or a lock washer may also be used between the underside surface 11 of the bolt head 12 and the engine cover 18, and a gasket such as a paper gasket, metal gasket, etc., may be used between the engine cover 18 and the engine block 20.

To perform a one-way shape transformation, the bolt 10 is heated. For heating, a heat gun, an oven, or electric current may be used. Moreover, because shape memory alloys can be configured to change shape over a large range of temperatures by varying the ratio of the alloys, a number of heat activators are available to initiate the transformation. These activators include radiant heat from a heater or the sun, an oven, a torch, etc. Where the application is amenable to torquing by radiant heat or in an oven, multiple bolts may be torqued at once by exposing the various bolts to the heat source simultaneously.

In the embodiment of FIG. 2, a hole 22 drilled and tapped in the engine block 20 is shown and indicated. This tapped hole 22 is relatively deep as compared to the thickness of the engine cover 18. Among other things, this is because shape memory alloys have limited strain recovery. That is, bolts comprising shape memory alloys only shrink a limited amount when they undergo an austenitic transformation (i.e., the amount of shrinkage from a stretched state to an unstretched original state is relatively small). A maximum of 6–8% strain recovery has been reported. However, a number in the order of 2.5–3% is more commonly reported. Thus, if a 60 thousandths (0.060 inch) preload (which is equivalent to say 6,000 pounds of force to stretch a ½ inch diameter bolt to a 75% yield) is required for a shape memory bolt with a known 3% strain recovery, a 2 inch bolt will have to be used (more specifically, the section that shrinks, i.e., the trained section, must be at least 2 inches long). Therefore, to implement the embodiment in FIG. 2, a relatively deep tapped hole must be drilled and tapped in the engine block 20 to accommodate the 2+ inch long bolt.

Although not shown, the bolt 10 may also be used with a nut in an open application (i.e., application without a tapped hole) such as for mating a pair of flanges to join two pipes together. In this open application, a stud is used with a nut on each of its two ends. In this instance, the limited strain recovery associated with shape memory alloys can be compensated by using a long stud with a spacer or a collar. The spacer or the collar can take up the space that is inherent with using a long stud made from a shape memory alloy (i.e., to fill the gap between the flange and one of the nuts). The collar or spacer in this instance can also be made of shape memory alloy. If so, the collar can be designed to have the opposite effect as the stud. That is, the collar can be trained to be in a "compressed" state so that when heated, it expands to its original length. The stud, on the other hand, could be trained to a "stretched" state so that when it is heated, it contracts to its original length. This way, some of the strain recovery needed for the stud is performed by the collar (a similar combination is further discussed below and relates to FIGS. 3 and 4).

Figure 3:
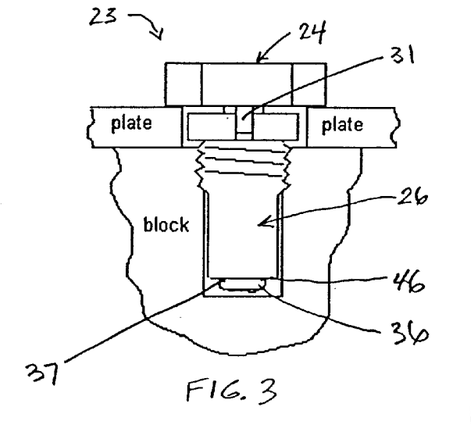
FIG. 3 is a combination cross-sectional view and elevation view of an alternative embodiment of a self-torquing fastener assembly provided in accordance with practice of the present invention threaded into a tapped hole.

FIG. 3 illustrates an alternative embodiment of the self-torquing bolt of the present invention. In this embodiment, the self-torquing bolt assembly 23 comprises an inner bolt 24 and an outer threaded collar 26. The bolt assembly 23 may be used to torque the same two structures as those described with respect to FIG. 2, except the threads of the tapped hole are at or near the opening of the tapped hole. As further discussed below, the alternative bolt assembly 23 eliminates the need to tap a deep hole to the hole's bottom by enabling the threads to be formed at or near the opening of the hole.

Figure 4:
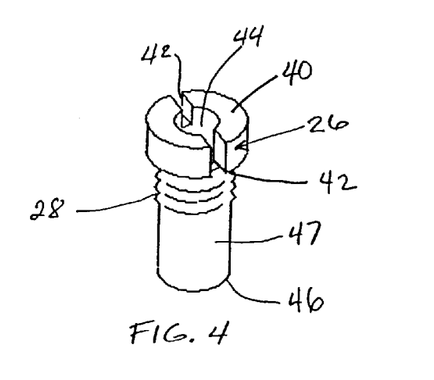
FIG. 4 is a semi-schematic isometric drawing of the threaded collar of the self-torquing fastener assembly of FIG. 3.
Figure 5:
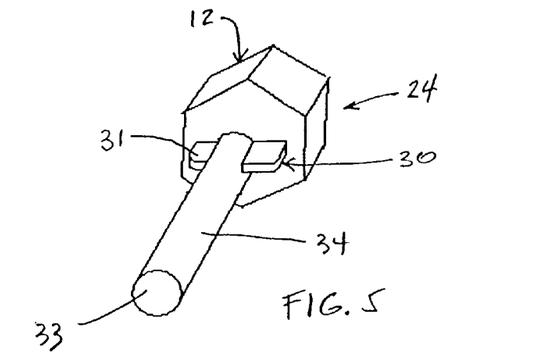
FIG. 5 is a semi-schematic isometric drawing of the inner bolt of the self-torquing fastener assembly of FIG. 3.

In detail, the inner bolt 24 includes a locking portion 30, which is similar to two tabs 31 symmetrically disposed along a shank portion 34 under the head 12. The locking portion 30 allows the bolt 24 to nestle and lock against the upper extremity of the threaded collar 26 at the channel 42 (FIGS. 3 and 4) The shank portion 34 of the inner bolt 24 resembles a threadless stem. The long shank portion 34 is flanked on one end by the head 12 and on its other end by a round end 33 (FIG. 5). However, as further discussed below, after the inner bolt is installed into the threaded collar 26 and the round end 33 is allowed to exit the threaded collar 26, the round end 33 is punched to form an axial retainer 36 (FIG. 3). After the end is punched and converted into the axial retainer 36, it resembles a wing nut or a punched and spread blob of material. The axial retainer 36 is configured to engage the bottom of the threaded collar 26 and to provide an anchoring point for the inner bolt 24 as the inner bolt shrinks (as it undergoes an austenitic transformation) to impart a compressive force against a structure. In an exemplary embodiment, the axial retainer 36 is formed from a sufficient amount of material having a sufficient amount of strength so that when the bolt 24 shrinks and compresses the threaded collar 26, the axial retainer 26 does not yield at the joint 37 (FIG. 3).

Referring to FIG. 5, to lock the bolt 24 against the threaded collar 26 and to prevent the two from rotating with respect to one another, in an exemplary embodiment, a pair of tabs 31 is machined or forged or crimped at the locking portion 30 of the inner bolt 24. As further discussed below, the tabs 31 fix the rotation between the inner bolt 24 and the threaded collar 26 by locking themselves, and hence the shank 34, into the channel or slot 42 along the upper surface of the threaded collar 26.

Referring again to FIGS. 3 and 4, as shown and described, the threaded collar 26 includes a head portion 40, a channel portion 42, and a passage 44 (FIG. 4), wherein the passage defines an inside diameter that is slightly larger than the diameter of the shank portion 34. Referring to FIG. 4, the channel portion 42 is machined into the head portion 40 of the threaded collar 26. Thus, when viewed from the orientation of FIG. 3, a portion of the tab 31 can be seen by looking through the channel 42.

The bolt assembly 23 illustrated in FIG. 3 is assembled as follows: first, the inner bolt 24 is inserted into the threaded collar 26 with the tabs 31 aligned and received by the channel 42. The inner bolt 24 is inserted so that the end 33 of the inner bolt 24 exits the bottom 46 of the threaded collar 26. Then with a punch, the end 33 is punched so that it flares or flattens out to form the axial retainer 36. Alternatively, the axial retainer 36 may be created by spot welding a piece of metal on the end 33, by inserting a screw or a pin on the end 33, or by similar means.

Both the bolt 24 and the threaded collar 26 can be made of shape memory alloys. In an exemplary embodiment, the threaded collar 26 is trained by compressing or shrinking the straight portion 47 of the threaded collar 26. Thus, when the threaded collar is heated to transform from a martensite to an austenite phase, the straight portion 47 expands and reverts to its original length. The bolt 24, on the other hand, is designed to shrink when heated, as previously discussed for the embodiment of FIGS. 1 and 2. More specifically, in an exemplary embodiment, the entire shank portion 34 of the inner bolt 24 is designed to contract when heated, whereas only the straight portion 47 below the thread portion 28 of the threaded collar 26 is configured to expand when heated.

Accordingly, the nested bolt assembly 23, which comprises the inner bolt 24 and the threaded collar 26, may be fastened into a tapped hole (such as the one shown in FIG. 2 but wherein the threads of the tapped hole is at or near the hole opening) by threading the thread portion 28 of the threaded collar 26 into the threads of the tapped hole. This threaded engagement (between the tapped hole and the thread portion 28) can be considered a first fixed position. That is, when the threaded collar is heated to undergo an austenitic transformation, the threaded collar is fixed at the first fixed position and is allowed to expand downward into the tapped hole (i.e., the straight portion 47 is allowed to expand downward into the tapped hole).

As previously discussed, the axial retainer 36 is held at the exit or retaining end 46 of the threaded collar 26. Thus, when the threaded collar 26 expands, it exerts a force in the axial retainer 36 in the direction of the expansion. At the same time, since the inner bolt 24 is designed to contract when it undergoes an austenitic transformation, the head 12 exerts a compressive force to the structure that the bolt is fastened against (such as the plate shown in FIG. 3). As before, the embodiment of FIG. 3 may be configured to be used with a washer and a gasket and their usage is understood to fall within the spirit and scope of the present invention.

In short, when the bolt assembly 23 is activated by a heat source, the straight portion 47 of the threaded collar 26 expands and the shank portion 34 of the bolt 24 shrinks. The expansion of the straight portion 47 of the threaded collar 26 causes the retaining end 46 of the threaded collar 26 to pull the axial retainer 36 in the direction of the expansion. Concurrently, since the bolt 24 is configured to shrink when it undergoes an austenitic transformation, the head 12 compresses down on the structure that is to be tightened (such as the engine cover). Thus, the combination of the shrinking bolt 24 and the expanding threaded collar 26 enables the bolt assembly 23 to torque a first structure against a second structure without having to machine threads at the bottom of the deep hole (i.e., the hole is tapped at or near the top of the deep hole). Moreover, since a portion of the strain recovery needed for the bolt 24 is taken up by the expanding threaded collar 26, the "deep hole" does not have to be as deep as earlier discussed to enable the bolt to provide the desired compression. This is because the bolt does not have to be as long as the relatively low strain recovery is compensated for by the expanding threaded collar.

Figure 6:
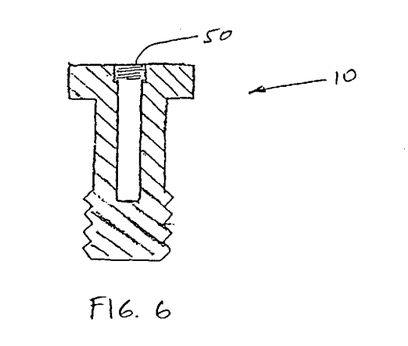
FIG. 6 is a cross-sectional view of yet another alternative embodiment of a self-torquing bolt provided in accordance with practice of the present invention.

Referring to FIG. 6, there is shown an alternative embodiment of the self-torquing bolt of the present invention. In this embodiment, the bolt 10 includes a cavity 50 for chemical storage. As readily understood by persons of ordinary skill in the art, in certain large bolt applications, such as for offshore oil rigs and ships, traditional heat activation methods (such as heat gun, electric arching, etc.) may not be practical and/or safe. Thus, where advantageous to do so, a cavity 50 or several cavities may be drilled in the bolt and packed with a chemical that releases heat upon ignition. Chemical in this instance is used broadly to include both liquid and powder forms. Suitable, safe, environmentally benign, and inexpensive powders exist for this purpose. In an exemplary embodiment, a mixture of chromium, manganese, and sulfur may be used. When the mixture is ignited, it leaves a trace of S02 and a ceramic deposit.

The cavity 50 in which the chemical is placed may be plugged to retain the chemical. A means to activate the chemical, such as a spark plug or a fuse, is required. Thus, after installation of the bolts, a worker can ignite the chemical in the cavity 50 with a spark, flame, or an electric arc. As before, heat generated by the chemical reaction will cause the bolt to undergo an austenitic transformation to self-torque itself down.

Figure 7:
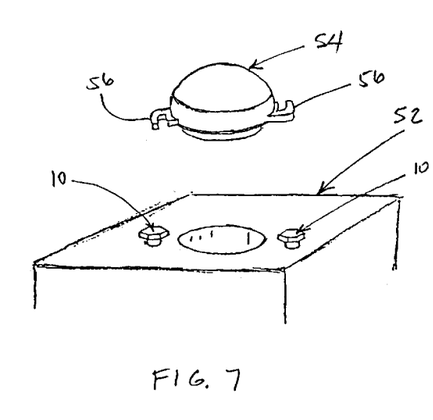
FIG. 7 is a semi-schematic isometric drawing of an application of the self-torquing bolt of FIG. 1.
Figure 8:
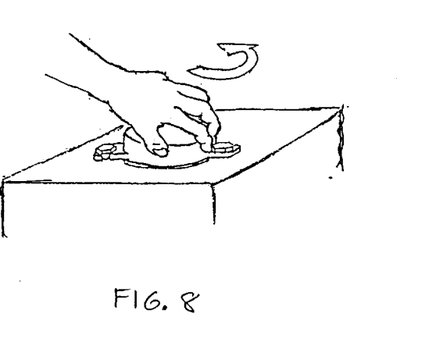
FIG. 8 is another semi-schematic isometric drawing of the application of FIG. 7 in an assembled state.

Referring to FIGS. 7 and 8, there is shown an exemplary application of the self-torquing bolt of the present invention. The square structure 52 as shown and described may represent an engine block and the dome shaped element 54 may represent a water pump. In one embodiment, the bolts 10 may be manually installed in an assembly line. Along that same assembly line, another user may install the dome shaped element 54 by turning a pair of tabs 56 into the waiting bolts 10 (FIG. 8). The bolts 10 may then be heated at the end of the assembly line using one of the aforementioned heating methods to torque down the dome shape element 54 against the square structure 52. Between the time of assembly and time of heating, the subassembly could be retained in place by friction, by a detent, by a spring washer, by an easily applied retainer installed manually, or by similar means.

It is understood that in the application of FIGS. 7 and 8, coordination between the dome shape manufacturer, the engine block manufacturer, and the bolt manufacturer have been executed. That is, the various manufacturers have made provisions for machining the deep tapped hole due to the limited strain recovery of shape memory bolts, have computed the activation temperature so that the dome shaped element does not get damaged when the bolt is heated, have computed the appropriate dimensions for the mating parts, and have computed the necessary preload for holding down the dome shape element by controlling the ratios of the various elements.

Instead of manually inserting the bolts 10 at the assembly line, in an alternative embodiment, it may be more efficient to have the bolts 10 inserted in the square structure 52 automatically, such as by robots during the manufacturing of the square structure 52. If so, the square structure 52 can be delivered to the assembly plant in the state shown in FIG. 7. The installation of the dome shape member 54 and the subsequent torquing may then be performed as discussed above.

In any application, it is understood that if and when the bolt is ever removed, such as for repairs of the equipment involved, the same bolt can be reused or replaced with a standard bolt. If reused, the bolt will have to be re-torqued manually by traditional means, such as with a torque wrench or a torque machine. If replaced, any bolt with a same dimension and length and at least the same or higher strength characteristics may be used. Use of the self-torquing bolt will not disrupt or change standard service and repair operations.

Figure 9:
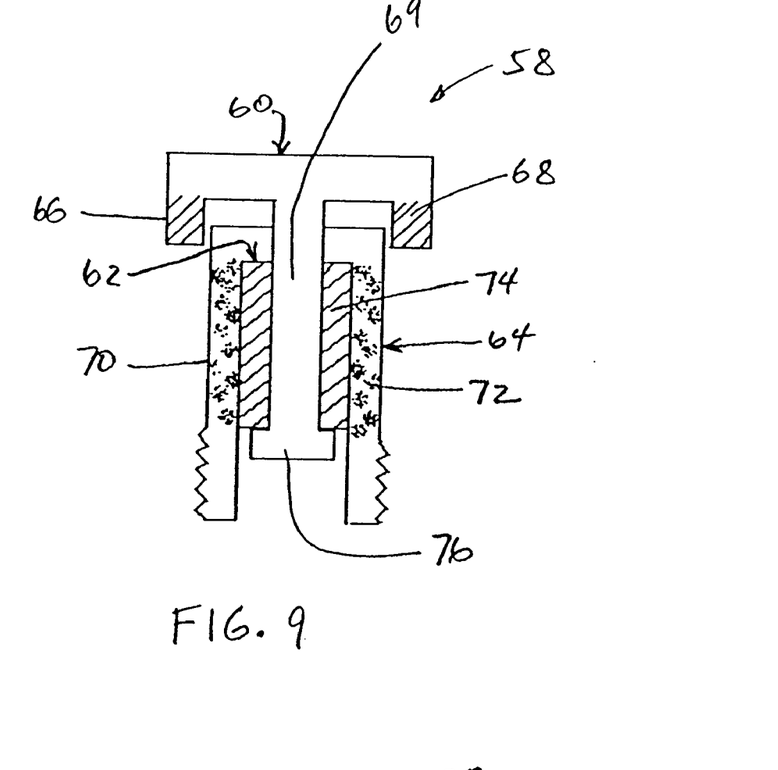
FIG. 9 is an exemplary cross-sectional view of yet another alternative embodiment of a self-torquing bolt provided in accordance with practice of the present invention.

Referring to FIG. 9 for yet another alternative embodiment of a self-torquing bolt assembly 58 provided in accordance with practice of the present invention. The bolt assembly 58 comprises an inner bolt 60, an intermediate collar 62, and an outer threaded retainer 64. Similar to the embodiment of FIGS. 3 and 4, the self-torquing bolt assembly 58 can torque any two structures together by a combination of expansion and contraction. As before, expansion and contraction are understood to mean the state of being expanded or contracted when a component is heated and transformed from a first martensite phase to a second austenite phase. Accordingly, the inner bolt 60 in this instance is configured to expand at or around the perimeter of the flange section 66, designated in FIG. 9 by the cross-hatched areas 68, and also to contract in its shank portion. However, the inner bolt 60 may also be manufactured with a more traditional head and without the expanding cross-hatched areas 68. If so, as further discussed below, the compression generated by the inner bolt 60 would be from the contracting shank portion 69.

Like the shank portion 69, the outer threaded retainer 64 is configured to contract in the straight section 70, designated by the mottled areas 72 in FIG. 9. Finally, the collar 62, like the inner bolt 60, is configured to expand the entire length of the collar 62, which is designated by the cross-hatched areas 74 in FIG. 9. As in the embodiment of FIGS. 3 and 4, it is understood that means is provided to prevent the inner bolt 60 from rotating with respect to the threaded retainer 640, such as by using a pair of tabs 31.

The bolt assembly 58 self-torques in the following fashion. Like the two-part bolt assembly in FIG. 3, the bolt assembly 58 is first threaded into a tapped hole. Once threaded, it is understood that the flange area 66 of the inner bolt 60 contacts a second structure that is to be bolted to the structure with the tapped hole. The bolt assembly 58 is then heated with one of the aforementioned methods. Once austenitic transformation temperature is reached, the expansion and contraction of the self-torquing bolt assembly 58 are provided as follows: First, the threaded retainer 64 shrinks and pulls the collar 62 in the direction of the shrinkage. Since the collar 62 is in contact with the inner bolt 60, the collar also pulls the inner bolt 60 in the direction of the shrinkage. Second, the inner bolt 60 expands around the flange area 66 (if provided). This expansion causes compression to the two part structures. Third, the shank 69 of inner bolt 60 can be made to shrink, as discussed in FIGS. 3 and 5. Finally, the collar 62 also expands. This expansion compresses down on the inner bolt 60 at the wing tip end 76, in the direction of the expansion, which causes further compression on the two structures by the inner bolt 60 at the flange area 66. As discussed in FIGS. 3 and 4, the retaining end 76 may be made by punching the end to spread the end. Slots may also be added to the end so that the end may easily spread when punched. Alternatively, a pin or a screw may be inserted on the end to retain the end against the collar 62.

Figure 10:
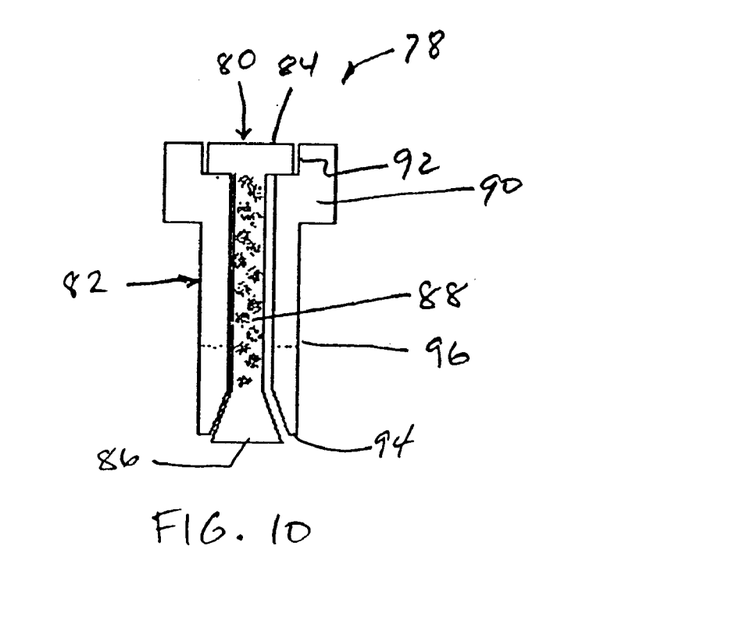
FIG. 10 is an exemplary cross-sectional view of still yet another alternative embodiment of a self-torquing faster/clamp provided in accordance with practice of the present invention.

Referring to FIG. 10 for yet another alternative embodiment of a self-torquing fastener assembly 78 provided in accordance with practice of the present invention. As before, the fastener assembly 78 uses phase transformation to tighten two structures together. However, in an exemplary embodiment, the fastener assembly 78 does not use threads. Instead, the fastener assembly 78 tightens two structures together by expanding within the bores of the two structures. Accordingly, the fastener assembly 78 is configured to be inserted into the bores of two structures and to hold the two structures together by gripping or wedging against the bore of at least one of the two structures.

The self-torquing fastener assembly 78 comprises an inner fastener 80 and an outer retainer 82. The inner fastener 80 further comprises a fastener head 84, a conical end 86, and a straight section 88 there between. The outer retainer 82 further comprises a retaining head 90 a tapered end 94, and a recessed area 92 for receiving the fastener head 84. The outer retainer also includes a pair of opposing slits (indicated by dashed lines labeled 95). As further discussed below, the slits can have a length that is about a third to about a half of the retainer straight section 96. However, the number and length of the slits and can be more or less or longer or shorter depending on the application and the desired effect.

As before, the fastener assembly 78 uses phase transformation to hold two structures together. Thus, in an exemplary embodiment, the inner fastener 80 is designed to contract when transformed from its martensite to its austenite phase. However, the outer retainer 82 is designed to have a single shape (i.e., it is not made from a shape memory alloy). The inner fastener's contraction is preferably limited to the straight section 88, which is indicated in FIG. 10 by the mottled areas. Accordingly, when the fastener assembly 78 is heated by one of the aforementioned techniques, the inner fastener 80 contracts. The contraction causes the conical end 86 of the inner fastener 80 to compress again the tapered end 94 of the outer retainer 82. The compression forces the slits to spread open. Thus, as the tapered end 94 deflects due to compression by the conical end 86, the conical end 86 causes the slits to spread open and wedge the tapered end 94 against the bore of the hole to which the fastener assembly 78 is inserted into. In effect, the fastener assembly 78 is secured to the bore by the wedging action, which in turn secures what ever structure that is placed between the retaining head 90 of the fastener assembly 78 and the structure to which the bore is part of.

Like the embodiment in FIGS. 3 and 4 and FIG. 9, the conical end 86 may be made by punching the end of the inner fastener 80, by inserting a pin or a screw, or if the end is sufficiently long, by spot welding a piece of metal thereon. Other alternatives are also contemplated and are within the knowledge of persons of ordinary skill in the art and which are understood to be within the spirit and scope of the present invention.

It should be understood that the foregoing embodiments are exemplary only, and that the present invention includes various other configurations which allow the torquing or clamping of a first member to a second member using self-torquing bolts or fasteners. Various shape memory alloys may be used instead of Nitinol, multiple nested parts may be used instead of just two, and in the multiple nested part embodiments, portions of the bolt can expand instead of shrink. Moreover, although martensite and austenite are extensively discussed as two phases which shape memory alloys exhibit, other terms or processes may be substituted to describe alloys having multiple phases and more than one shape when the alloys are exposed to a heat source that is sufficient to change the alloys from a first phase to a second phase. The specific shape memory alloy may also change. For instance, variants of the examples indicated may be made (i.e., percent ratio of the compounds discussed above) as well as new alloys with similar characteristics may be substituted without deviating from the scope of the present invention. Accordingly, many alterations and modifications may be made by those having ordinary skill in the art without departing from the spirit and scope of the invention. Therefore, it must be understood that the disclosed embodiments have been set forth only for the purposes of illustrations and that they should not be understood to be limiting the invention to what are defined by the foregoing examples.

What is claimed is:

1. A self-torquing bolt assembly comprising an inner bolt disposed at least in part in an outer threaded collar, wherein both the inner bolt and the threaded collar comprise a shape memory alloy; said inner bolt further including a threadless stem and an axial retainer, and said threaded collar further including a channel for receiving a portion of the inner bolt, an annular space, and a collar bottom; wherein said inner bolt is disposed at least in part within said annular space and is secured to said threaded collar in part by said axial retainer abutting against said collar bottom, and wherein when the bolt assembly is heated, the bolt assembly is adapted to apply compressive stress to an object to torque the object to a desired compressive force value.

2. The bolt assembly of claim 1, wherein thie inner bolt further comprises a head portion adapted to be used with a wrench.

3. The bolt assembly of claim 1, wherein said outer threaded collar further comprises a head portion and wherein said head portion comprises the channel.

4. The bolt assembly of claim 2, wherein the head portion defines a polygon shaped head.

5. The bolt assembly of claim 3, wherein the channel comprises an opening sized to receive a shank portion of the inner bolt.

6. The bolt assembly of claim 3, wherein the head portion comprises a hex head.

7. The bolt assembly of claim 1, wherein the shape memory alloy includes nickel-titanium; titanium-palladium-nickel; iron-zinc-copper-aluminum; titanium-niobium-aluminum; titanium-niobium; copper-aluminum-nickel; uranium-niobium; copper-zinc-aluminum; nickel-titanium-copper; iron-manganese-silicon; hafnium-titanium-nickel; nickel-iron-zinc-aluminum; copper-aluminum-iron; nickel-zirconium-titanium; and zirconium-copper-zinc.

8. The bolt assembly of claim 1, wherein the inner bolt and the outer threaded collar are configured to change from a first shape to a second shape upon being exposed to heat.

9. The bolt assembly of claim 8, wherein the first shape and the second shape of the inner bolt and the outer threaded collar have opposite relationship.

10. The bolt assembly of claim 1, wherein the outer threaded collar comprises a cylindrical body and the cylindrical body comprises an exterior threaded portion.

11. The bolt assembly of claim 1, wherein the inner bolt comprises a locking portion and wherein the locking portion is received within a channel of the outer threaded collar.

12. The bolt assembly of claim 11, wherein the exterior threaded portion is spaced apart from the collar bottom.

13. A self-torquing fastener assembly made from a shape memory alloy, said fastener assembly comprising an inner fastener portion comprising an inner fastener head portion, the inner fastener portion attached to an outer fastener portion, both the inner fastener portion and the outer fastener portion are configured to change from a first phase to a second phase when activated by a heat source and remain in the second phase even after the heat source is removed, wherein the inner fastener portion is in an abutting relationship with a flat portion of the outer fastener portion at an end opposite the inner fastener head portion in both the first phase and the second phase, and wherein when the fastener assembly is fastened to an object and heated, the fastener assembly is adapted to apply a compressive force value to the object.

14. The fastener assembly of claim 13, wherein the second shape of the respective inner and outer fastener portions comprise a martensite phase.

15. The fastener assembly of claim 13, wherein the shape memory alloy have characteristics which include a martensitic transformation temperature that is sufficiently lower than a service temperature of the fastener assembly.

16. The fastener assembly of claim 13, wherein the shape memory alloy have characteristics which include an austenitic transformation temperature that is sufficiently higher than a service temperature of the fastener assembly.

17. The fastener assembly of claim 13, wherein the shape memory alloy comprises an austenitic transformation temperature and a martensitic transformation temperature with a wide hysteresis.

18. The fastener assembly of claim 13, wherein the outer fastener portion comprises a thread portion and wherein the thread portion is configured to change from a first shape to a second shape when activated by the appropriate heat source.

19. The fastener assembly of claim 13, wherein the outer fastener portion comprises a slit and the inner fastener portion comprises a tapered end, and wherein the tapered end is adapted to spread the slit when the fastener assembly changes to the second phase.

20. The fastener assembly of claim 19, further comprising a second slit.

21. The fastener assembly of claim 13, wherein the outer fastener portion comprises an exterior threaded portion.

22. The fastener assembly of claim 13, wherein the outer fastener portion comprises a head portion and a channel disposed in the head portion and the inner fastener portion comprises a locking portion and the locking portion is received by the channel of the outer fastener portion.

* * * * *